United States Patent
Kairali et al.

(10) Patent No.: US 10,013,265 B2
(45) Date of Patent: Jul. 3, 2018

(54) MANAGEMENT OF CONTAINER HOST CLUSTERS

(71) Applicant: International Business Machines Corporation, Armonk, NY (US)

(72) Inventors: Sudheesh S. Kairali, Kozhikode (IN); Neeraj Kumar Kashyap, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 29 days.

(21) Appl. No.: 15/190,213

(22) Filed: Jun. 23, 2016

(65) Prior Publication Data
US 2017/0372173 A1 Dec. 28, 2017

(51) Int. Cl.
*G06K 9/00* (2006.01)
*G06F 9/455* (2018.01)
*G06K 9/62* (2006.01)
*G06F 17/30* (2006.01)

(52) U.S. Cl.
CPC .......... *G06F 9/455* (2013.01); *G06F 17/3028* (2013.01); *G06K 9/6218* (2013.01)

(58) Field of Classification Search
CPC ............................ G06F 9/455–9/45558; G06F 2009/45562–2009/45595; G06F 8/63
USPC ................ 382/225, 295, 276, 100, 151; 1/1; 707/999.001; 709/227; 713/176; 718/1; 726/1
See application file for complete search history.

(56) References Cited

U.S. PATENT DOCUMENTS

| | | | |
|---|---|---|---|
| 8,756,598 B1 * | 6/2014 | Costea | G06F 9/45558 717/174 |
| 8,880,638 B2 * | 11/2014 | Jeswani | H04L 67/2842 709/214 |
| 9,122,562 B1 | 9/2015 | Stickle | |
| 9,229,759 B2 | 1/2016 | Jujare et al. | |
| 9,256,467 B1 * | 2/2016 | Singh | G06F 9/5055 |
| 9,426,030 B1 * | 8/2016 | Anerousis | H04L 41/08 |
| 9,495,269 B1 * | 11/2016 | Hart | G06F 3/0619 |
| 9,626,166 B1 * | 4/2017 | Alewine | H04L 63/0428 |
| 9,690,622 B1 * | 6/2017 | Argenti | G06F 9/4881 |
| 9,880,771 B2 * | 1/2018 | Hirsch | G06F 3/0641 |
| 9,886,300 B2 * | 2/2018 | Nakatsu | G06F 9/45558 |

(Continued)

OTHER PUBLICATIONS

Luzzardi, Andrea, "Scaling Docker With Swarm", Docker Blog, Feb. 26, 2015, © 2016 Docker, 10 pages, <https://blog.docker.com/2015/02/scaling-docker-with-swarm/>.

(Continued)

*Primary Examiner* — Aaron W Carter
(74) *Attorney, Agent, or Firm* — Nicholas L. Cadmus; James H. Mayfield (57) ABSTRACT

A method, executed by a computer, includes receiving, for a cluster, a request to create a new container host, wherein the cluster comprises a plurality of container hosts having a corresponding plurality of local repositories, creating the new container host, selecting an image for the new container host according to one or more host preferences, wherein the image is stored in an image location, and copying the image from the image location to the local repository of the new container host. A computer system and computer program product corresponding to the above method are also disclosed herein.

17 Claims, 5 Drawing Sheets

(56) References Cited

U.S. PATENT DOCUMENTS

| | | | |
|---|---|---|---|
| 2011/0145816 A1* | 6/2011 | Glikson | G06F 9/45558 |
| | | | 718/1 |
| 2012/0005346 A1* | 1/2012 | Burckart | G06F 9/5077 |
| | | | 709/226 |
| 2012/0005673 A1* | 1/2012 | Cervantes | G06F 9/45558 |
| | | | 718/1 |
| 2013/0339316 A1* | 12/2013 | Hirsch | G06F 3/0641 |
| | | | 707/692 |
| 2016/0283261 A1* | 9/2016 | Nakatsu | G06F 9/45558 |
| 2016/0330277 A1* | 11/2016 | Jain | H04L 67/1095 |
| 2016/0359955 A1* | 12/2016 | Gill | G06F 9/45558 |
| 2017/0147813 A1* | 5/2017 | McPherson | G06F 21/554 |
| 2017/0177860 A1* | 6/2017 | Suarez | G06F 21/53 |
| 2017/0177877 A1* | 6/2017 | Suarez | G06F 21/577 |
| 2017/0180346 A1* | 6/2017 | Suarez | G06F 9/45558 |
| 2017/0249141 A1* | 8/2017 | Parees | G06F 8/70 |
| 2017/0249374 A1* | 8/2017 | Parees | G06F 17/30598 |
| 2017/0322824 A1* | 11/2017 | Reuther | G06F 3/0604 |
| 2017/0339008 A1* | 11/2017 | Dion | H04L 41/08 |
| 2017/0366606 A1* | 12/2017 | Ben-Shaul | H04L 67/1008 |
| 2017/0371693 A1* | 12/2017 | Corrie | G06F 9/45558 |
| 2018/0032410 A1* | 2/2018 | Kang | G06F 11/1469 |
| 2018/0046487 A1* | 2/2018 | Matters | G06F 17/30174 |

OTHER PUBLICATIONS

Slater, Nate, "Cluster-Based Architectures Using Docker and Amazon EC2 Container Service", printed on May 13, 2016, 6 pages, <https://medium.com/aws-activate-startup-blog/cluster-based-architectures-using-docker-and-amazon-ec2-container-service-f74fa86254bf#.hhn4hn2cc>.

"Docker Swarm", printed on May 13, 2016, 4 pages, <https://docs.docker.com/swarm/>.

"Kubernetes/docs at master—kubernetes/kubernetes—GitHub", printed on May 13, 2016, © 2016 GitHub, Inc., 2 pages, <https://github.G0m/kubernetes/kubernetes/tree/master/docs>.

"Kubernetes—Images", Reference Documentation, printed on May 13, 2016, 5 pages, <http://kubernetes.io/docs/user-guide/images/>.

* cited by examiner

MANAGEMENT OF CONTAINER HOST CLUSTERS

BACKGROUND OF THE INVENTION

The present invention relates generally to container hosts, and more specifically, to the management of a cluster of container hosts.

In the field of virtualization, container hosts are systems within operating systems that may create and manage containers, which are instances of images. Multiple container hosts may be grouped together to form a cluster. When a specific container is created from an image, the container may be placed on a selected container host by cluster management software. One problem with managing container hosts is providing images to hosts when requested without encountering delays due to bandwidth considerations.

SUMMARY

As disclosed herein, a method, executed by a computer, includes receiving, for a cluster, a request to create a new container host, wherein the cluster comprises a plurality of container hosts having a corresponding plurality of local repositories, creating the new container host, selecting an image for the new container host according to one or more host preferences, wherein the image is stored in an image location, and copying the image from the image location to the local repository of the new container host. A computer system and computer program product corresponding to the above method are also disclosed herein.

DETAILED DESCRIPTION

Embodiments of the present invention relate generally to container hosts, and more specifically, to the management of a cluster of container hosts. When a container host instantiates a container from an image, the container host may require that image to be in the container host's local repository. When the image is not in the local repository, there may be delays introduced while the container host waits for the image to be transferred to its local repository.

One problem with managing a cluster of container hosts is that delays can be introduced when a container host does not yet have the image to be instantiated in its repository. Container hosts may also lack access to images that are in the repositories of neighboring container hosts. A solution may be to automatically copy a highly-used image to all container hosts' repositories. Another way to optimize management of container hosts may be to copy highly-used images to a container host's repository when the container host is first created. Finally, a cluster of container hosts may benefit from the ability of container hosts to retrieve images from the repositories of other container hosts, rather than from a repository that is remote to the cluster.

It should be noted that references throughout this specification to features, advantages, or similar language herein do not imply that all of the features and advantages that may be realized with the embodiments disclosed herein should be, or are in, any single embodiment of the invention. Rather, language referring to the features and advantages is understood to mean that a specific feature, advantage, or characteristic described in connection with an embodiment is included in at least one embodiment of the present invention. Thus, discussion of the features, advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages will become more fully apparent from the following drawings, description and appended claims, or may be learned by the practice of the invention as set forth hereinafter. The present invention will now be described in detail with reference to the figures.

Figure 1:
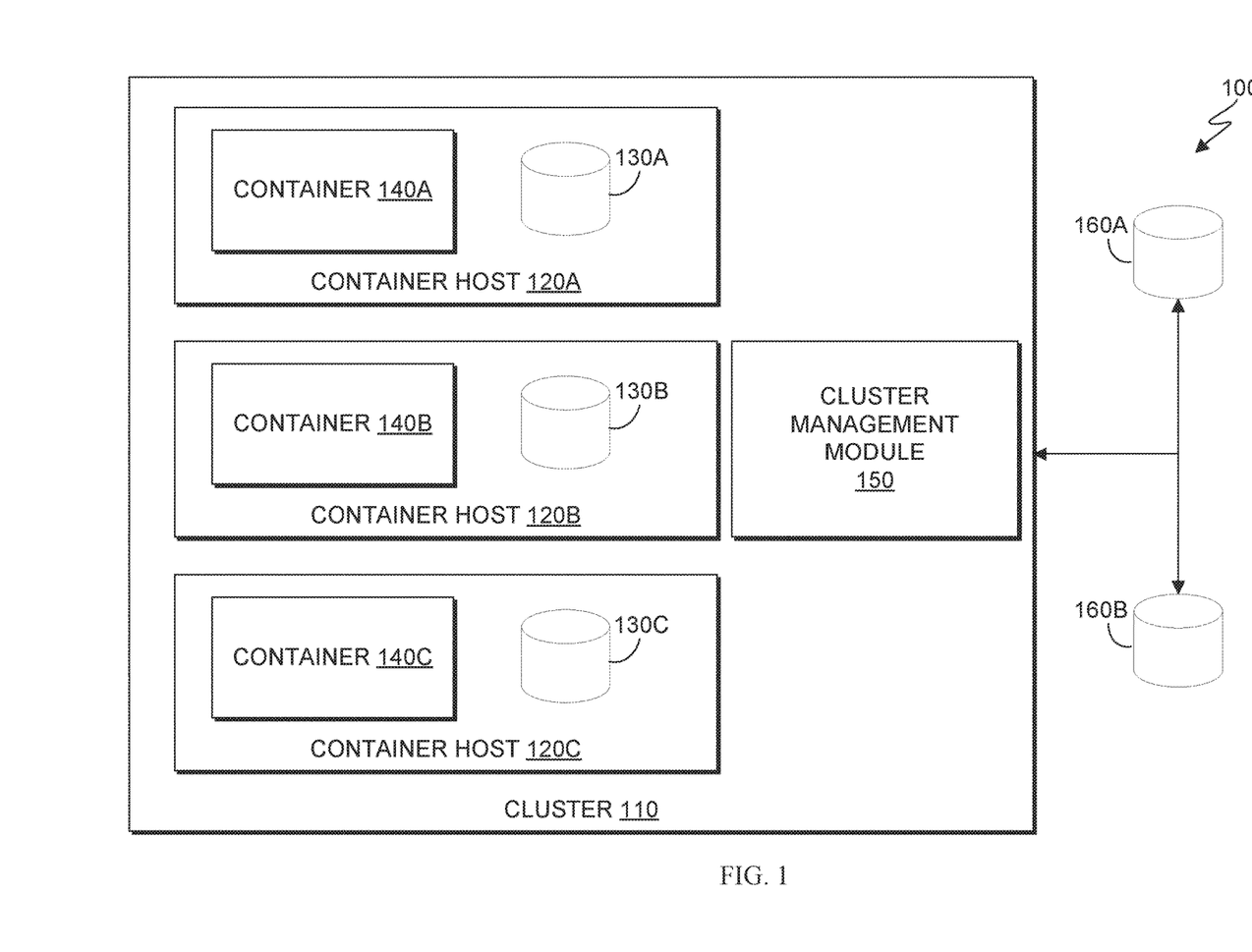
FIG. 1 is a block diagram depicting one example of a cluster management system in accordance with embodiments of the present invention.

FIG. 1 is a block diagram depicting one example of a cluster management system 100 in accordance with embodiments of the present invention. As depicted, cluster management system 100 includes cluster 110, container hosts 120A-120C, local repositories 130A-130C, containers 140A-140C, cluster management module 150, and remote repositories 160A and 160B. Cluster management module 150 may manage container hosts 120A-120C in conjunction with execution of the various methods discussed herein.

Cluster 110 may be defined as a group of multiple container hosts, such as container hosts 120A-120C. Cluster 110 may be subject to rules that affect its container hosts on a cluster-wide level. Container hosts 120A-120C may include any system capable of one or more containers. Container hosts 120A-120C differ from virtual machines in that each container may share the same kernel as its container host. Container hosts 120A-120C may be responsible for allocating and managing computing resources to hosted containers 140A-140C, as well as enabling containers 140A-140C to communicate to/from container hosts 140A-140C. In the depicted embodiment, there are three container hosts 120A-120C; however, in other embodiments, more or fewer container hosts may form a cluster.

Containers 140A-140C may include instances of images that are hosted by a container host. When a container host instantiates an image, a container may be formed. A container host may instantiate a container from an image stored in its local repository; for example, container host 120B may select an image in local repository 130B and instantiate the image as container 140B. Local repositories 130A-130C may include any form of storage that is local to its container host and capable of storing images. While in the depicted embodiment, each container host 120A-120C has one corresponding container 140A-140C respectfully, the number of containers per container host may vary, and a container host may not host any containers.

Cluster management module 150 may manage cluster 110 as a whole by managing the individual container hosts 120A-120C. In some embodiments, cluster management module 150 manages container hosts 120A-120C according to rules provided by a user. Cluster management module 150 may, for example, instruct container hosts 120A-120C to start or stop hosting containers. Cluster management module 150 may also provide container hosts 120A-120C with new or different images for storage in the local repositories 130A-130C, or instruct container hosts 120A-120C to remove or share images from their local repositories 130A-130C.

Remote repositories 160A and 160B may include any storage capable of storing images. Remote repositories 160A and 160B are remote from the perspective of cluster 110 and its container hosts 120A-120C, so cluster 110's quality of access to remote repositories 160A and 160B may be diminished as compared to its quality of access to local repositories 130A-130C. In some embodiments, remote repositories 160A and 160B serve as libraries of images, and cluster 110 may acquire images for its container hosts 120A-120C when necessary. Cluster management module 150 may be responsible for requesting that images from remote repositories 160A and 160B be transferred to local repositories 130A-130C. While in the depicted embodiment there are two remote repositories 160A and 160B, the number of remote repositories may be greater or fewer.

Figure 2:
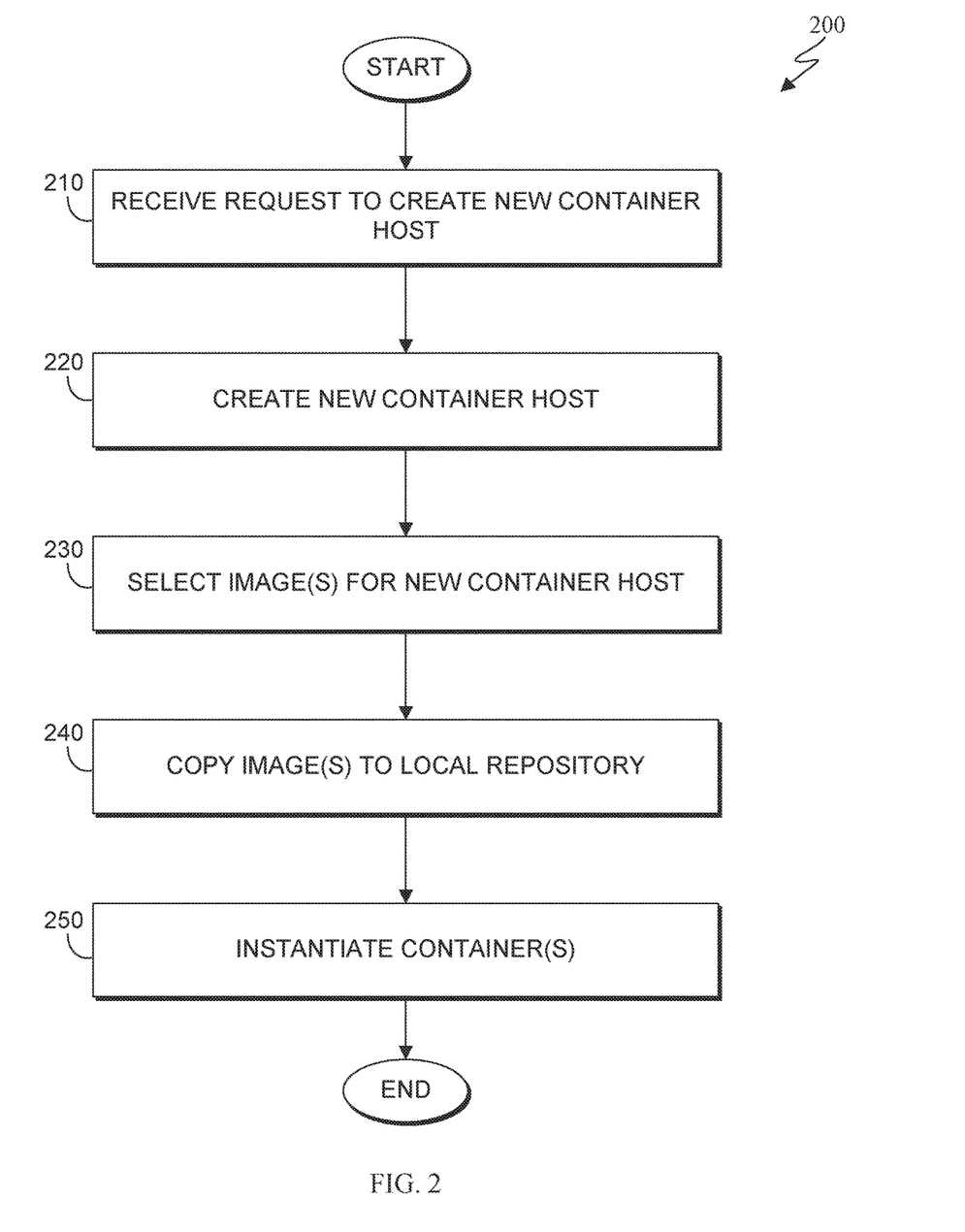
FIG. 2 is a flow chart depicting one example of a container hosting method in accordance with embodiments of the present invention.

FIG. 2 is a flow chart depicting an example of a container hosting method 200 in accordance with embodiments of the present invention. As depicted, container hosting method 200 includes receiving (210) a request, creating (220) a new container host, selecting (230) images, copying (240) images, and instantiating (250) a container. Container hosting method 200 may add a new container host to a cluster and enable the container host to instantiate one or more containers.

Receiving (210) a request may include receiving a request to create a new container host. The request may be received by cluster management module 150. In some embodiments, the request contains specifications regarding the quality and quantity of computing resources to be allocated to the new container host.

Creating (220) a new container host may include allocating computing resources for the new container host, creating the container host, and adding the container host to cluster 110. Creating (220) a new container host may also include creating a local repository for the new container host for the purpose of storing images.

Selecting (230) images may include selecting one or more images for the new container host. In some embodiments, cluster management module 150 selects the image(s) for the new container host according to criteria or rules. For example, if certain containers are underrepresented in the cluster, cluster management module 150 may select images corresponding to those containers. Cluster management module 150 may also select specific images in response to a request to instantiate those images as containers. The image selection operation 230 may also include selecting the source location of an image, such as a particular repository. For example, if cluster management module 150 selects a version of an image that is located both on remote repository 160A and remote repository 160B, but remote repository 160A is offering a slower download speed than remote repository 160B, then cluster management module 150 may retrieve the image from remote repository 160B over repository 160A. In some embodiments, cluster management module 150 may select image(s) stored on local repositories 130A-130C of container hosts 120A-120C in addition to remote repositories 160A and 160B.

Copying (240) images may include copying the selected image(s) to the new container host's local repository. An image may be copied to a local repository from a remote repository or the local repository of another container host participating in cluster 110. For example, if new container host is container host 120C and the selected image is stored on remote repository 160B and container host 120A's local repository 130A, then the selected image may be copied to local repository 130C from either remote repository 160B or local repository 130A. In some embodiments, other local repositories are prioritized over remote repositories as sources for images when it is faster to use a local repository as a source.

Instantiating (250) a container may include hosting the selected image as a container inside of a container host. For example, a selected image stored in local repository 130C may be instantiated as container 140C inside of container host 120B. Each container may use the same kernel as its container host. In some embodiments, cluster management module 150 manages the instantiation/deinstantiation of containers.

Figure 3:
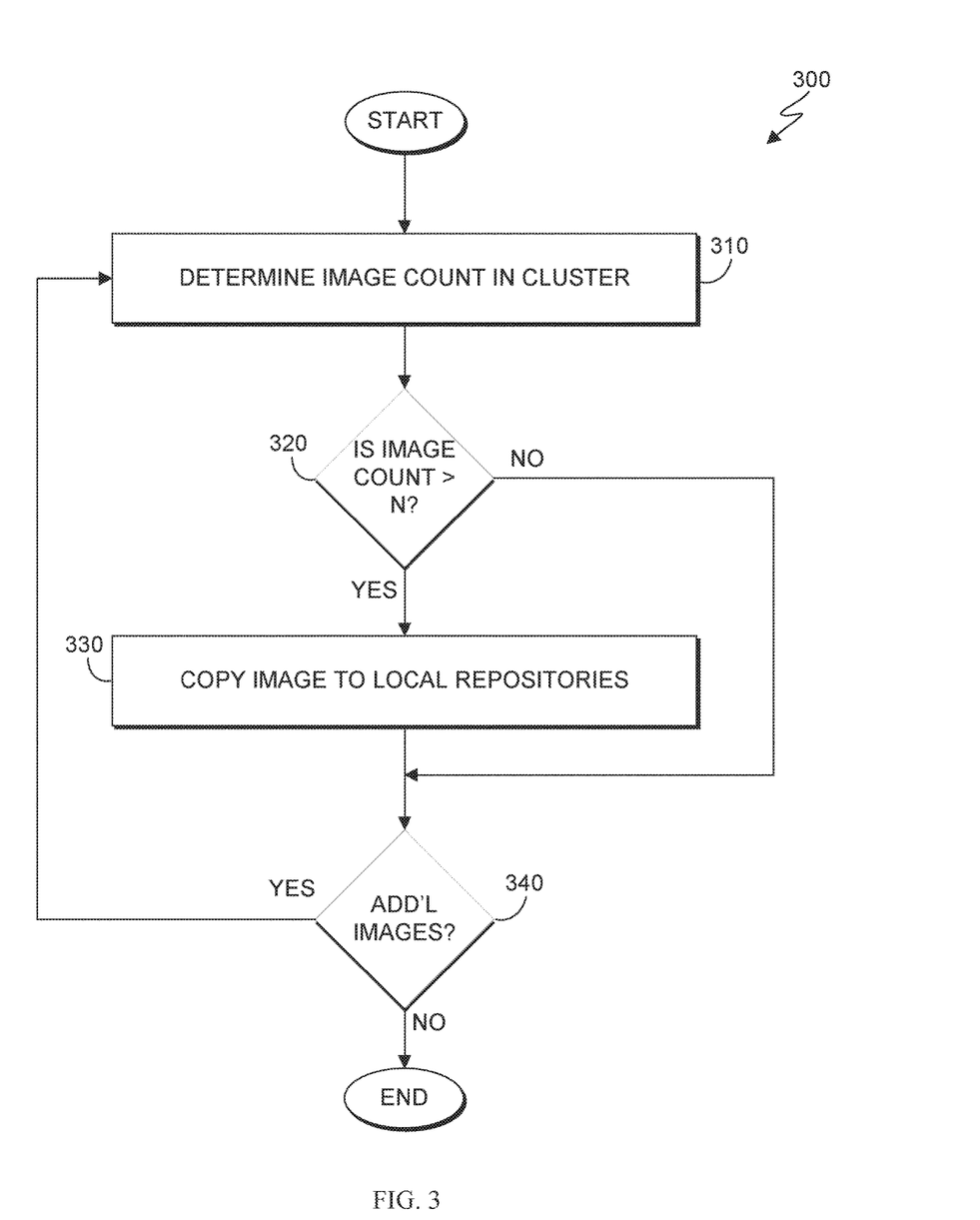
FIG. 3 is a flow chart depicting one example of a cluster optimization method in accordance with embodiments of the present invention.

FIG. 3 is a flow chart depicting an example of a cluster optimization method in accordance with embodiments of the present invention. As depicted, cluster optimization method 300 includes determining (310) the image count, comparing (320) the image count to a threshold, copying (330) images, and determining (340) whether there are additional images. Cluster optimization method 300 may determine which images in particular are the most highly used, and ensure that all members of cluster 110 have access to those images.

Determining (310) the image count may include determining how many container hosts that are a member of a cluster have a given image in their local repository and/or are currently hosting the image as a container. For example, if a cluster has ten container hosts, and there are seven container hosts whose local repository contains the image, then the image count is seven. In some embodiments, the image count is a count of all images that are currently instantiated as containers.

Comparing (320) the image count to a threshold may include checking whether the image count is greater than or equal to a predetermined number. For example, if the image count is seven, and the threshold is five, then the image count exceeds the threshold and cluster optimization method 300 proceeds to image copying operation 330. If the image count does not exceed the threshold, then cluster optimization method 300 may proceed to operation 340. In some embodiments, a user inputs a threshold or adjusts a preconfigured threshold. Cluster management module 150 may dynamically identify when images are popular or highly-used by comparing the image count for a given image to the threshold. For example, if a given image is represented in 90% of container hosts' local repositories, then that image may be highly-used in the context of that cluster.

Copying (330) images may include copying the highly-used image to the local repositories of all container hosts belonging to cluster 110. If a container host already has the image in its local repository, then that image may not be copied. By copying highly-used images to all local repositories that do not already contain it, cluster optimization method 300 may ensure that every container host has the highly-used image. In some embodiments, the images are copying asynchronously. The images may be copied from a remote repository, or from the local repository of another container host.

Determining (340) whether there are more images may include determining that there are one or more additional images in the cluster, and repeating operations 310-330 if there are. Thus, cluster optimization method 300 loops in order to ensure that all highly-used images in a cluster are copied to local repositories. If there is at least one additional image to be considered, method 300 returns to operation 310; else, method 300 terminates.

Figure 4:
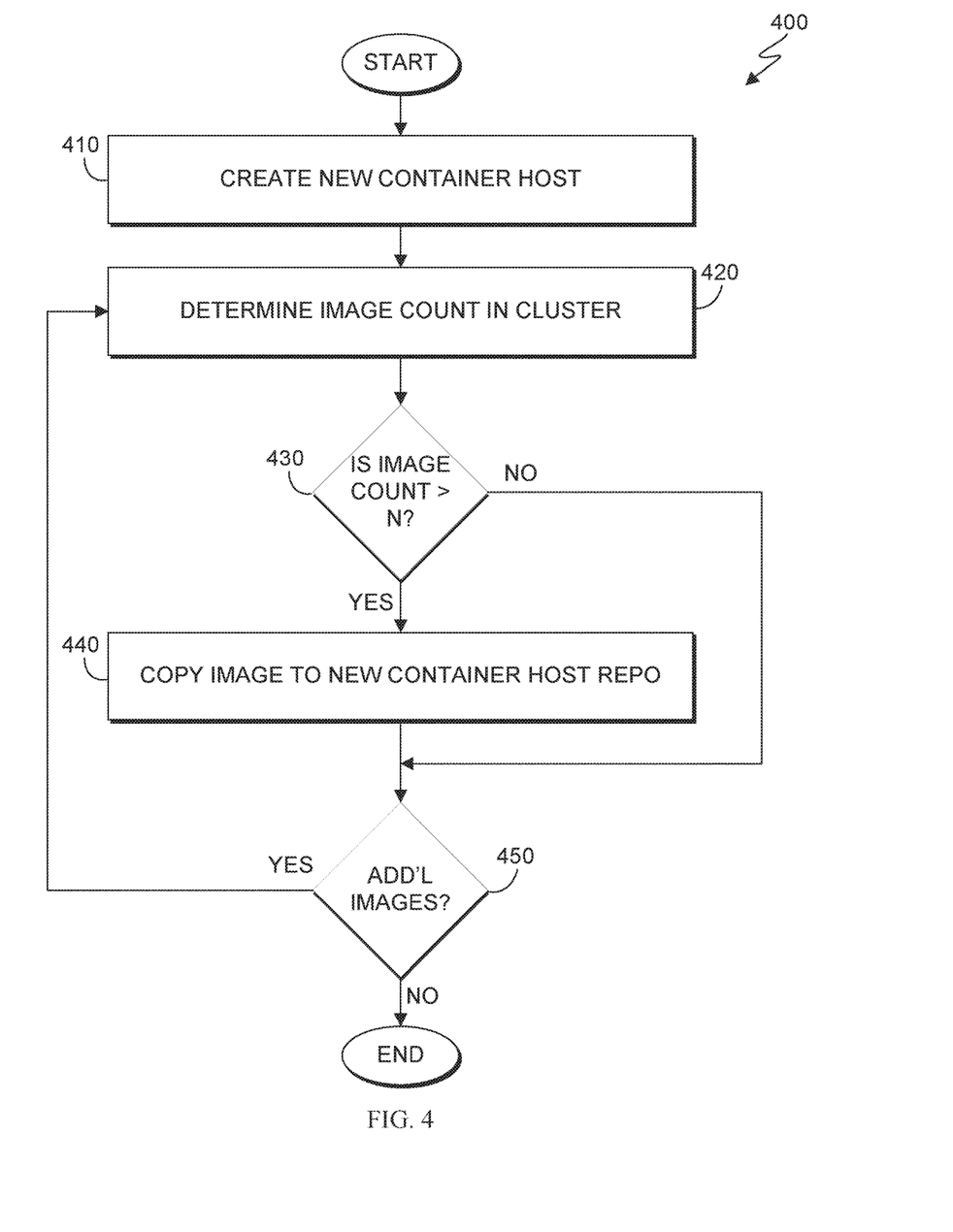
FIG. 4 is a flow chart depicting one example of a host creation method in accordance with embodiments of the present invention.

FIG. 4 is a flow chart depicting an example of a host creation method 400 in accordance with embodiments of the present invention. As depicted, host creation method 400 includes creating (410) a new container host, determining (420) the image count, comparing (430) the image count to a threshold, copying (440) images, and determining (450) whether there are additional images. Host creation method 400 may provide newly-created container hosts with images that are frequently used by other container hosts in cluster 110.

Creating (410) a new container host may include allocating computing resources for the new container host, creating the container host, and adding the container host to cluster 110. Creating (410) a new container host may also include creating a local repository for the new container host for the purpose of storing images.

Determining (420) the image count may include determining how many container hosts that are a member of a cluster have a given image in their local repository and/or are currently hosting the image as a container. For example, if a cluster has ten container hosts, and there are seven container hosts whose local repository contains the image, then the image count is seven. In some embodiments, the image count is a count of all images that are currently instantiated as containers.

Comparing (430) the image count to a threshold may include checking whether the image count is greater than or equal to a predetermined number. For example, if the image count is seven, and the threshold is five, then the image count exceeds the threshold and host creation method 400 proceeds to image copying operation 440. If the image count does not exceed the threshold, then host creation method 400 may proceed to operation 450. In some embodiments, the threshold may change dynamically and be determined by cluster management module 150. Thus, by comparing the image count for a given image to a threshold, popular or highly-used images may be identified. For example, if a given image is represented in 90% of container hosts' local repositories, then that image may be highly-used in the context of that cluster. In some embodiments, the threshold is set such that only images that are represented in 100% of the cluster hosts may proceed down the yes branch to the image copying operation 440.

Copying (440) images may include copying the highly-used image to the local repository of the container host created at host creation operation 410. By copying the highly-used images to new container hosts, host creation method 400 may ensure that newly-created container hosts have highly-used images in their local repositories. In some embodiments, the images are copying asynchronously. The images may be copied from a remote repository, or from the local repository of another container host, depending on network access to remote repository or bandwidth considerations.

Determining (450) whether there are more images may include determining that there are one or more additional images in the cluster, and repeating operations 420-440 if there are. Thus, host creation method 400 loops in order to ensure that all highly-used images in a cluster are copied to the new container host's local repository. If there is at least one additional image to be considered, method 400 returns to operation 420; else, method 400 terminates.

Figure 5:
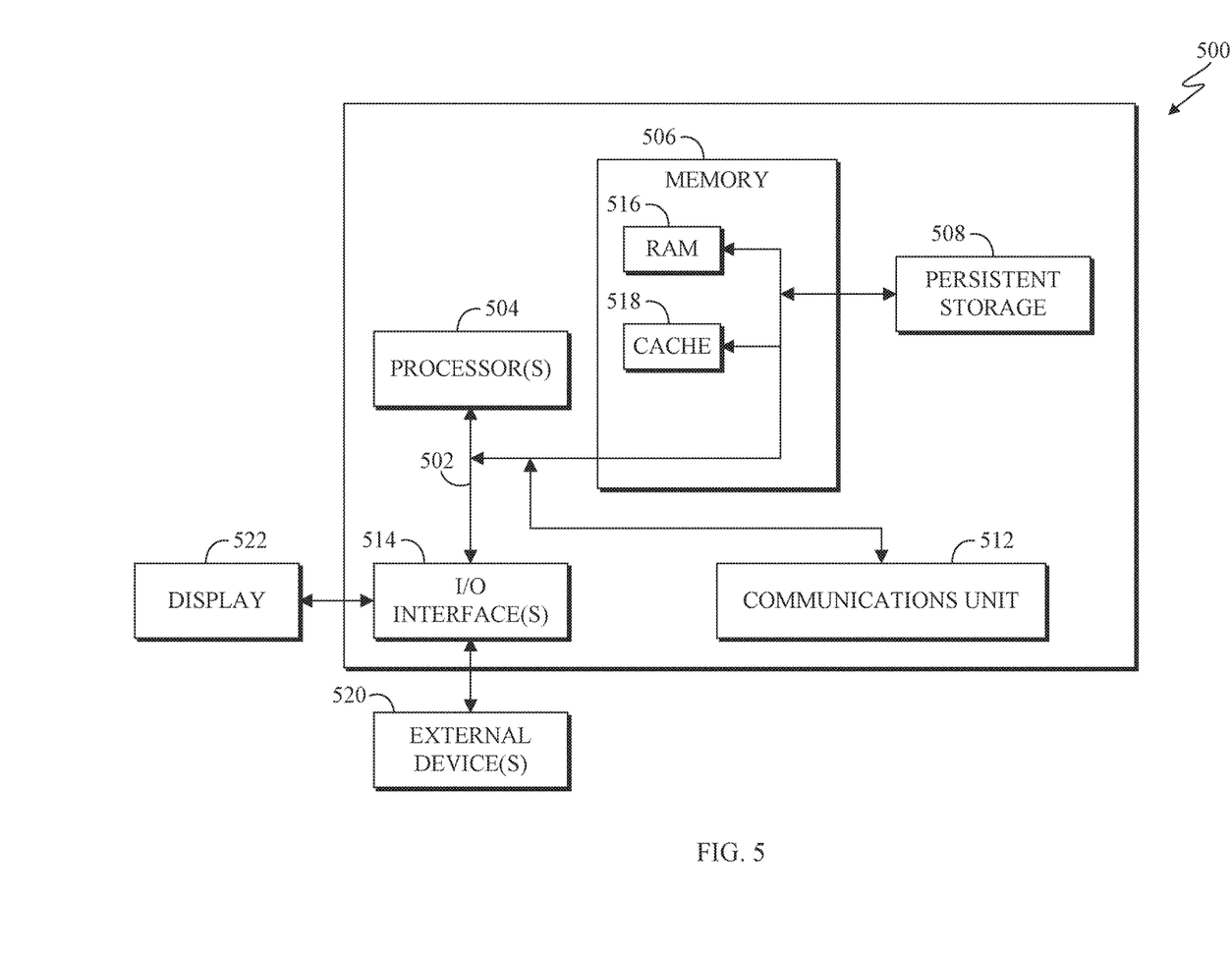
FIG. 5 is a block diagram depicting one example of a computing apparatus (i.e., computer) suitable for executing the methods disclosed herein.

FIG. 5 is a block diagram depicting components of a computer 500 suitable for executing the methods disclosed herein. It should be appreciated that FIG. 5 provides only an illustration of one embodiment and does not imply any limitations with regard to the environments in which different embodiments may be implemented. Many modifications to the depicted environment may be made.

As depicted, the computer 500 includes communications fabric 502, which provides communications between computer processor(s) 504, memory 506, persistent storage 508, communications unit 512, and input/output (I/O) interface(s) 514. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer readable storage media. In the depicted embodiment, memory 506 includes random access memory (RAM) 516 and cache memory 518. In general, memory 506 can include any suitable volatile or non-volatile computer readable storage media.

One or more programs may be stored in persistent storage 508 for execution by one or more of the respective computer processors 504 via one or more memories of memory 506. The persistent storage 508 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 512, in these examples, provides for communications with other data processing systems or devices. In these examples, communications unit 512 includes one or more network interface cards. Communications unit 512 may provide communications through the use of either or both physical and wireless communications links.

I/O interface(s) 514 allows for input and output of data with other devices that may be connected to computer 500. For example, I/O interface 514 may provide a connection to external devices 520 such as a keyboard, keypad, a touch screen, and/or some other suitable input device. External devices 520 can also include portable computer readable storage media such as, for example, thumb drives, portable optical or magnetic disks, and memory cards.

Software and data used to practice embodiments of the present invention can be stored on such portable computer readable storage media and can be loaded onto persistent storage 508 via I/O interface(s) 514. I/O interface(s) 514 may also connect to a display 522. Display 522 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The embodiments disclosed herein include a system, a method, and/or a computer program product. The computer program product may include a computer readable storage medium (or media) having computer readable program instructions thereon for causing a processor to carry out the methods disclosed herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method, the method comprising:
receiving, for a cluster, a request to create a new container host, wherein the cluster comprises a plurality of container hosts having a corresponding plurality of local repositories; creating the new container host;
selecting an image for the new container host according to one or more host preferences, wherein the image is stored in an image location;
copying the image from the image location to the local repository of the new container host;
identifying a highly-used image that exists in a selected percentage of the plurality of local repositories, wherein the selected percentage is defined by a user; and
copying the highly-used image to the local repository of each container host of the plurality of container host that does not already have the highly-used image.

2. The method of claim 1, wherein the image location for the highly-used image is the local repository of a container host of the plurality of container hosts.

3. The method of claim 1, wherein selecting an image for the new container host according to one or more host preferences comprises selecting an image that exists in a selected percentage of the plurality of local repositories, wherein the selected percentage is defined by a user.

4. The method of claim 1, wherein selecting an image for the new container according to one or more host preferences comprises selecting an image that exists in the local repository of a most recently created container host.

5. The method of claim 1, wherein the image location is the local repository of a container host of the plurality of container hosts.

6. The method of claim 1, further comprising instantiating a container on the new container host using the image.

7. A computer system comprising: one or more computer processors; one or more computer readable storage media; program instructions stored therein for execution by at least one of the one or more computer processors, the program instructions comprising instructions for:
receiving, for a cluster, a request to create a new container host, wherein the cluster comprises a plurality of container hosts having a corresponding plurality of local repositories; creating the new container host;
selecting an image for the new container host according to one or more host preferences, wherein the image is stored in an image location;
copying the image from the image location to the local repository of the new container host;
identifying a highly-used image that exists in a selected percentage of the plurality of local repositories, wherein the selected percentage is defined by a user; and
copying the highly-used image to the local repository of each container host of the plurality of container host that does not already have the highly-used image.

8. The computer system of claim 7, wherein the image location for the highly-used image is the local repository of a container host of the plurality of container hosts.

9. The computer system of claim 7, wherein selecting an image for the new container host according to one or more host preferences comprises selecting an image that exists in a selected percentage of the plurality of local repositories, wherein the selected percentage is defined by a user.

10. The computer system of claim 7, wherein selecting an image for the new container according to one or more host preferences comprises selecting an image that exists in the local repository of a most recently created container host.

11. The computer system of claim 7, wherein the image location is the local repository of a container host of the plurality of container hosts.

12. The computer system of claim 7, further comprising instructions for instantiating a container on the new container host using the image.

13. A computer program product comprising:
a computer readable storage medium and program instructions stored on the computer readable storage medium, the program instructions comprising instructions for:
receiving, for a cluster, a request to create a new container host, wherein the cluster comprises a plurality of container hosts having a corresponding plurality of local repositories; creating the new container host;
selecting an image for the new container host according to one or more host preferences, wherein the image is stored in an image location;
copying the image from the image location to the local repository of the new container host;
identifying a highly-used image that exists in a selected percentage of the plurality of local repositories, wherein the selected percentage is defined by a user; and
copying the highly-used image to the local repository of each container host of the plurality of container host that does not already have the highly-used image.

14. The computer program product of claim 13, wherein the image location for the highly-used image is the local repository of a container host of the plurality of container hosts.

15. The computer program product of claim 13, wherein selecting an image for the new container host according to one or more host preferences comprises selecting an image that exists in a selected percentage of the plurality of local repositories, wherein the selected percentage is defined by a user.

16. The computer program product of claim 13, wherein selecting an image for the new container according to one or more host preferences comprises selecting an image that exists in the local repository of a most recently created container host.

17. The computer program product of claim 13, wherein the image location is the local repository of a container host of the plurality of container hosts.

* * * * *